(12) United States Patent
Muro, II et al.

(10) Patent No.: US 11,774,260 B2
(45) Date of Patent: Oct. 3, 2023

(54) DYNAMIC OBFUSCATION OF A MAPPED POINT OF INTEREST

(71) Applicant: Airbnb, Inc., San Francisco, CA (US)

(72) Inventors: David John Muro, II, San Francisco, CA (US); Adam James Shutsa, San Francisco, CA (US); Johann Kevin Kerbrat, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 360 days.

(21) Appl. No.: 16/795,526

(22) Filed: Feb. 19, 2020

(65) Prior Publication Data

US 2021/0140785 A1     May 13, 2021

Related U.S. Application Data

(60) Provisional application No. 62/935,076, filed on Nov. 13, 2019.

(51) Int. Cl.
*G06Q 10/02*     (2012.01)
*G01C 21/36*     (2006.01)
(Continued)

(52) U.S. Cl.
CPC ..... *G01C 21/3673* (2013.01); *G01C 21/3476* (2013.01); *G01C 21/367* (2013.01);
(Continued)

(58) Field of Classification Search
CPC ............ G01C 21/3682; G01C 21/3614; G01C 21/32; G06F 3/0482; G06F 3/0481;
(Continued)

(56) References Cited

U.S. PATENT DOCUMENTS 8,719,251 B1    5/2014   English et al.
8,781,735 B2 *   7/2014   Udeshi .................. G01C 21/30
                                                                       701/457
(Continued)

FOREIGN PATENT DOCUMENTS

AU       2017219142 A1 *   3/2018   ............. G06Q 30/02
JP        2016-038305 A      3/2016
WO     WO-2007142494 A1 * 12/2007   ......... G06Q 30/0601

OTHER PUBLICATIONS

Greenbaum, H. "Who Made Google's Map Pin?," The $6^{th}$ Floor, Just another nytimes.com Blogs weblog, Apr. 18, 2011, one page, [Retrieved on Jul. 23, 2021], Retrieved from the Internet <URL: https://6thfloor.blogs.nytimes.com/2011/04/18/who-made-googles-map-pin/>.

(Continued)

*Primary Examiner* — Redhwan K Mawari
*Assistant Examiner* — Kathleen B Ward
(74) *Attorney, Agent, or Firm* — Schwegman Lundberg & Woessner, P.A.

(57) ABSTRACT

A system and a method are disclosed for obscuring a location of an accommodation. A booking accommodation application obscures an exact location of the accommodation provided by a host. The booking accommodation application displays a visual representation of the accommodation on a map interface. Even when the map interface is zoomed in, the visual representation maintains the obfuscation of the accommodation.

20 Claims, 14 Drawing Sheets

(51) Int. Cl.
*G01C 21/34* (2006.01)
*H04W 4/021* (2018.01)
*G06F 3/0482* (2013.01)
*G06T 11/60* (2006.01)

(52) U.S. Cl.
CPC ..... *G01C 21/3679* (2013.01); *G01C 21/3682* (2013.01); *G06F 3/0482* (2013.01); *G06Q 10/02* (2013.01); *G06T 11/60* (2013.01); *H04W 4/021* (2013.01)

(58) Field of Classification Search
CPC .. G06F 3/0485; G06F 16/9535; G06F 16/535; G06F 3/04817; G06Q 10/02; G06Q 30/06; G06Q 50/12; G06Q 50/14; G06Q 50/16; G06T 11/60; G06T 2200/24; G06T 3/40; H04W 4/021; Y10S 707/946; Y10S 715/962
See application file for complete search history.

(56) References Cited

U.S. PATENT DOCUMENTS

| | | | |
|---|---|---|---|
| 9,739,631 B2 | 8/2017 | McIllhany et al. | |
| 10,395,276 B1 | 8/2019 | Fulghum et al. | |
| 10,692,126 B2* | 6/2020 | Li | G06Q 30/0623 |
| 10,708,278 B1 | 7/2020 | Cuan et al. | |
| 11,175,157 B1* | 11/2021 | Elder | G06T 3/40 |
| 2001/0030667 A1 | 10/2001 | Kelts | |
| 2006/0206264 A1 | 9/2006 | Rasmussen | |
| 2006/0229802 A1 | 10/2006 | Vertelney et al. | |
| 2006/0287810 A1 | 12/2006 | Sadri et al. | |
| 2007/0268313 A1 | 11/2007 | Dolph et al. | |
| 2008/0040684 A1 | 2/2008 | Crump | |
| 2008/0097966 A1 | 4/2008 | Choi et al. | |
| 2008/0172244 A1 | 7/2008 | Coupal et al. | |
| 2009/0150757 A1 | 6/2009 | Hara et al. | |
| 2010/0027527 A1 | 2/2010 | Higgins et al. | |
| 2010/0094548 A1 | 4/2010 | Tadman et al. | |
| 2010/0217525 A1 | 8/2010 | King et al. | |
| 2010/0241987 A1 | 9/2010 | Russ et al. | |
| 2011/0145228 A1 | 6/2011 | Laurenzo et al. | |
| 2011/0224896 A1 | 9/2011 | Napieraj | |
| 2012/0120115 A1 | 5/2012 | Sato | |
| 2012/0221595 A1* | 8/2012 | Slowe | G06Q 30/0283 707/769 |
| 2012/0259692 A1* | 10/2012 | Monteverde | G06Q 30/0224 705/14.66 |
| 2012/0268485 A1* | 10/2012 | Icho | G06F 16/29 345/629 |
| 2013/0073323 A1 | 3/2013 | Zacharia et al. | |
| 2013/0297206 A1 | 11/2013 | Heng et al. | |
| 2014/0136986 A1 | 5/2014 | Martin et al. | |
| 2014/0278591 A1 | 9/2014 | Blecharczyk et al. | |
| 2014/0280180 A1* | 9/2014 | Edecker | G06F 16/285 707/769 |
| 2015/0019328 A1* | 1/2015 | Abhyanker | G06Q 30/0261 705/14.58 |
| 2015/0073941 A1 | 3/2015 | Burrows et al. | |
| 2016/0098929 A1 | 4/2016 | Nakhjavani | |
| 2016/0171011 A1 | 6/2016 | Drogobetski et al. | |
| 2016/0298974 A1 | 10/2016 | Newlin et al. | |
| 2016/0298977 A1 | 10/2016 | Newlin et al. | |
| 2016/0371800 A1 | 12/2016 | Kirshenboim | |
| 2017/0185271 A1 | 6/2017 | Manoharan et al. | |
| 2018/0058877 A1 | 3/2018 | Andrew et al. | |
| 2018/0094940 A1* | 4/2018 | Rothschild | G06F 9/452 |
| 2018/0130347 A1 | 5/2018 | Ricci et al. | |
| 2018/0178812 A1 | 6/2018 | Kassner et al. | |
| 2021/0140784 A1 | 5/2021 | Muro et al. | |

OTHER PUBLICATIONS

United States Office Action, U.S. Appl. No. 16/795,525, dated Dec. 17, 2021, 30 pages.

Nonko, E., "This map tells you how far you can walk, bike, drive or ride public transit in a set amount of time," 6sqft, Jan. 23, 2018, six pages, [Online] [Retrieved on Mar. 17, 2021], Retrieved from the Internet <URL: https//www.6sqft.com/this-map-tells-yon-how-far-you-can-walk-bike-drive-or-ride-public-transit-in-a-set-amount-of-time/>.

Sterling, G., "TravelTime maps API lets users search by time rather than distance," Search Engine Land, Mar. 25, 2019, four pages, Retrieved on Mar. 17, 2021], Retrieved from the Internet <URL: https://searchengineland.com/traveltime-maps-api-lets-users-search-by-time-rather-than-distance-314501>.

"U.S. Appl. No. 16/795,525, Advisory Action dated Apr. 5, 2023", 3 pgs.

"U.S. Appl. No. 16/795,525, Examiner Interview Summary dated Mar. 2, 2022", 3 pgs.

"U.S. Appl. No. 16/795,525, Examiner Interview Summary dated Sep. 20, 2021", 2 pgs.

"U.S. Appl. No. 16/795,525, Final Office Action dated Jan. 4, 2023", 30 pgs.

"U.S. Appl. No. 16/795,525, Non Final Office Action dated Mar. 29, 2022", 29 pgs.

"U.S. Appl. No. 16/795,525, Non Final Office Action dated Jun. 18, 2021", 17 pgs.

"U.S. Appl. No. 16/795,525, Response filed Mar. 1, 2022 to Final Office Action dated Dec. 17, 2021", 11 pgs.

"U.S. Appl. No. 16/795,525, Response filed Mar. 28, 2023 to Final Office Action dated Jan. 4, 2023", 11 pgs.

"U.S. Appl. No. 16/795,525, Response filed Sep. 14, 2021 to Non Final Office Action dated Jun. 18, 2021", 12 pgs.

"U.S. Appl. No. 16/795,525, Response filed Sep. 26, 2022 to Non Final Office Action dated Mar. 29, 2022", 11 pgs.

"Translation of JP2016038305A", (2016), 22 pgs.

* cited by examiner

DYNAMIC OBFUSCATION OF A MAPPED POINT OF INTEREST

CROSS REFERENCE TO RELATED APPLICATIONS

This application claims the benefit of U.S. Provisional Application No. 62/935,076, filed Nov. 13, 2019, which is incorporated by reference in its entirety. This application is related to U.S. application Ser. No. 16/795,525, titled "Contextualizing the Location of a Mapped Point of Interest via a Dynamic Pin," and U.S. application Ser. No. 16/795,521, titled "Displaying Mapped Points Relative to a User Input Radius," both of which are filed on an even date herewith and incorporated herein by reference in their entireties.

TECHNICAL FIELD

The disclosure generally relates to the field of map user interfaces, and more specifically, map user interfaces for use in booking accommodation applications.

BACKGROUND

A user may seek accommodation via an account on an accommodation platform. Conventional accommodation platforms publicly present information about accommodations. However, owners may seek to limit the information about their accommodations that is presented to the public.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5B illustrates one example embodiment of the map interface displaying the obfuscated accommodation while zoomed in.

DETAILED DESCRIPTION

Figure 1:
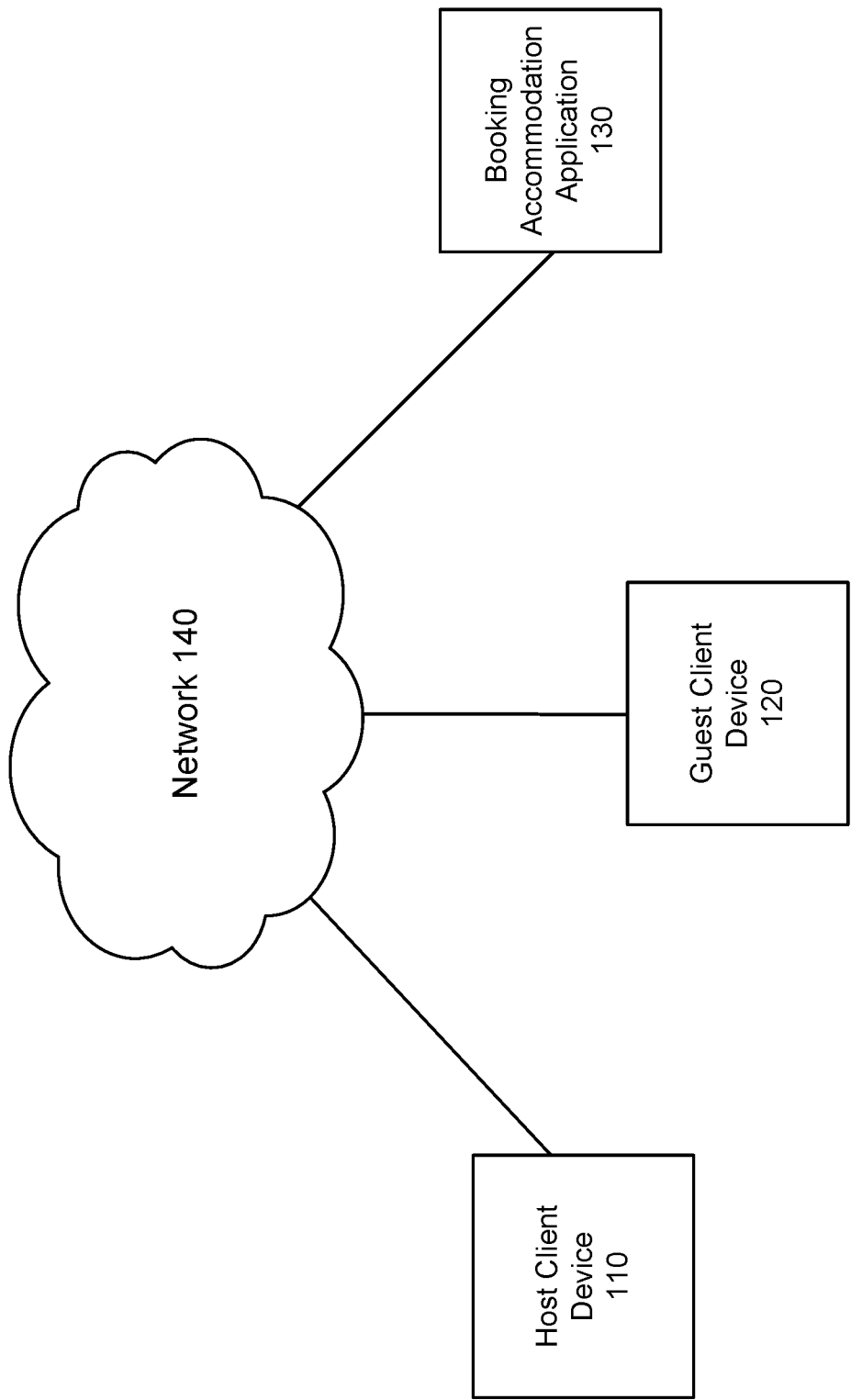
FIG. 1 illustrates one example embodiment of a system environment including a host client device, a guest client device, a booking accommodation application, and a network.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium relates to a map user interface that includes a dynamic pin that directs a user viewing a map interface to a point of interest. When the user views the map interface at a geolocation, the dynamic pin points towards the point of interest. The shape of the dynamic pin changes as the user moves, via the map interface, to a new geolocation, corresponding to a distance between the point of interest and the user's geolocation.

The map interface also displays inventory (e.g., accommodation) relative to radii about a point of interest. Based on an input radius, the map interface displays time-expiring inventory located within and/or around the radius of the point of interest.

Finally, the map interface dynamically obfuscates a mapped point. As the user zooms in and out of the map interface, the exact location of the mapped point remains obfuscated, while generally indicating the vicinity around the mapped point. The map interface described herein improves the user's experience in interacting with and contextualizing locations viewed via the map interface through the dynamic pin and inventory displayed near the point of interest, while protecting inventory hosts' privacy through dynamic obfuscation.

A processor receives a first geolocation of a client device and an input indicating a point of interest and determines a route between the first geolocation and the point of interest. The processor displays, on a map on the client device, a generalized visual indication of a direction towards the point of interest. The generalized visual indication is an overlaid bubble with a pointed portion that is directed towards the point of interest. The overlaid bubble is separate from a map route indication. When the processor receives a second geolocation as input, the second geolocation closer to the point of interest than the first geolocation, the processor displays the overlaid bubble with a rounded portion.

The processor receives an input indicating a point of interest at a booking accommodation application from a client device and determines one or more time-expiring inventory items with locations within a vicinity of the point of interest. The processor receives, from the client device, a selection of a threshold distance from the point of interest and determines a subset of the time-expiring inventory items with locations within the threshold distance of point of interest. The processor generates and displays a map interface on the client device. The map includes visual representations of the point of interest and the subset of items of time-expiring inventory within a circle of a radius of the threshold distance.

The processor receives a time-expiring inventory item from a host client device, at the booking accommodation application. The processor generates and displays a map interface on a guest client device, such that the map interface includes a visual representation of the time-expiring inventory item that obfuscates its location. In response to an input that indicates zooming in on the map interface on the guest client device, the processor increases the size of the visual representation obfuscating the location of the time-expiring inventory item.

Booking Accommodation Application System Environment

FIG. 1 illustrates one example embodiment of a system environment 100. The system environment 100 in this example includes a host client device 110, a guest client device 120, a booking accommodation application 130, and a network 140. The system environment 100 enables guests to reserve accommodation, provided by hosts, via the booking accommodation application 130. Each accommodation is only available for a certain amount of time, and thereby is considered time-expiring inventory.

A host provides an accommodation via the host client device 110. The host client device 110 takes accommodation parameters as input. Accommodation parameters include information related to an accommodation, such as price, room type, bed type, number of bedrooms, number of bathrooms, cleaning fee, availability, check in time, check out time, location, size, cancelation policy, amenities, house rules, and so on. The host client device 110 may be any device that is or incorporates a computer, such as a smartphone, a personal computer, a laptop a wearable device (e.g., smart watch), and/or an internet enabled device. A computer includes any device having one or more general or special purpose processors, memory, storage, and networking components (either wired or wireless). The host client device 110 can execute an operating system, for example, a Microsoft Windows-compatible operating system (OS), Apple OS X or iOS, a Linux distribution, or Google's Android OS. In some embodiments, the host client device 110 includes a user interface that the host can interact with. A plurality of hosts may provide accommodations, each through their own host client devices 110.

A guest seeks and accesses the host's accommodation via the guest client device 120. The guest client device 120 takes trip parameters as input. Trip parameters include information about accommodation the guest seeks, such as a desired location, check in date, check out date, number of guests, room type preference, price range, desired amenities, and so on. The guest client device 120 may be any device that is or incorporates a computer, such as a smartphone, a personal computer, a laptop a wearable device (e.g., smart watch), and/or an internet enabled device. A computer includes any device having one or more general or special purpose processors, memory, storage, and networking components (either wired or wireless). The host client device 110 can execute an operating system, for example, a Microsoft Windows-compatible operating system (OS), Apple OS X or iOS, a Linux distribution, or Google's Android OS. In some embodiments, the guest client device 120 includes a user interface that the guest can interact with. Within the system environment 100, a plurality of guests, each using their own guest client device 120, may seek and/or access accommodation listed by hosts.

The booking accommodation application 130 allows hosts to post accommodation listings and guests to search for and book accommodations. The booking accommodation application 130 may be hosted and executed by the host client device 110 and/or the guest client device 120. The booking accommodation application 130 includes a user interface for both hosts and guests to interact with, which in some embodiments, includes a map user interface to specify a location of an accommodation and/or points of interest around the accommodation. The booking accommodation application 130 is further described with respect to FIG. 2.

The network 140 transmits data between the host client device 110, the guest client device 120, and the booking accommodation application 130. The network 140 may be a local area and/or wide area networks using wireless and/or wired communication systems, such as the Internet. In some embodiments, the network 140 transmits data over a single connection (e.g., a data component of a cellular signal, WiFi, among others) and/or over multiple connections. The network 140 may include encryption capabilities to ensure the security of consumer data. For example, encryption technologies may include secure sockets layer (SSL), transport layer security (TLS), virtual private networks (VPNs), Internet Protocol security (IPsec), etc.

Figure 2:
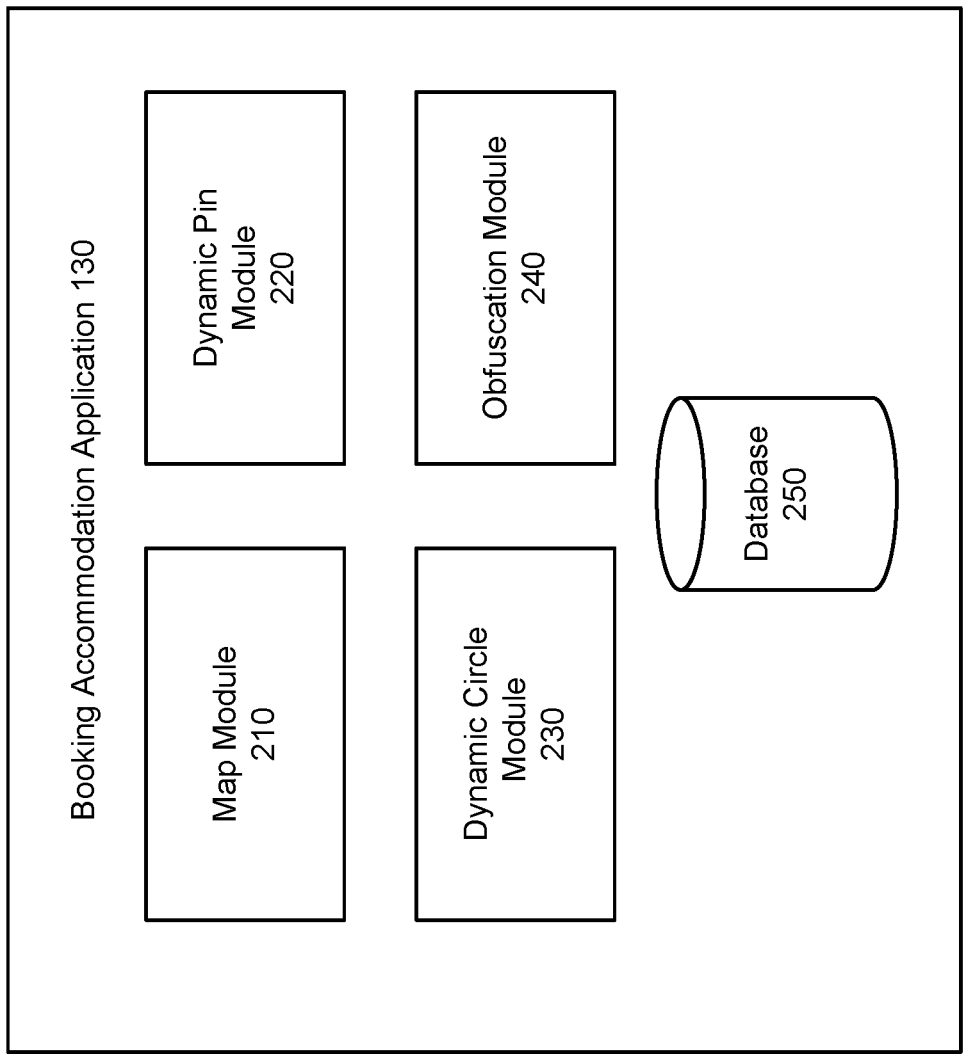
FIG. 2 illustrates one example embodiment of modules within the booking accommodation application server.

FIG. 2 illustrates one example embodiment of modules within the booking accommodation application server 130. The modules may correspond to processing structures (e.g., program code (or software)) that execute the functionality as described on a computer system, for example, one having some or all of the components of the computer system described with FIG. 9.

As described above, the booking accommodation application 130 enables hosts to post accommodations and guests to seek and/or access the posted accommodations. The booking accommodation application 130 may include a map user interface that guests and hosts may interact with while viewing a location of a listed accommodation. The booking accommodation application 130 may include a map module 210, a dynamic pin module 220, a dynamic circle module 230, an obfuscation module 240, and a database 250. The booking accommodation application 130 may include modules other than those described here.

The map module 210 receives input corresponding to a location, e.g., a user input that may be a location of interest. The user of the booking accommodation application 130 may enter the user input into the booking accommodation application 130. In some embodiments, the booking accommodation application 130 determines the location from prior user search history (e.g., on the guest client device 120). In some embodiments, the booking accommodation application 130 provides, without user input, the location to the map module 210, the location selected from a list of suggested locations of interest. The map module 210 presents a map interface that shows the location on a map to the user of the booking accommodation application 130. The map module 210 determines a geolocation from the user input to the booking accommodation 130. For example, a user (e.g., a host and/or a guest) may provide a location of interest to the booking accommodation application 130 via the host client device 110 and/or the guest client device 120. The user input may specify a geolocation, through a postal code, a city, a district, a county, and/or a country. In some embodiments, the map module 210 determines the geolocation from a location of the host client device 110 and/or the guest client device 120 (e.g., via GPS). In some embodiments, the user input is one or more points of interest (e.g., tourist attractions, landmarks, schools, restaurants, etc.). The map module 210 renders a map showing the input geolocation to the user, via the booking accommodation application 130. In some embodiments, the map module 210 renders accommodations and/or points of interest in proximity to the input geolocation. The map module 210 also presents relevant information about the accommodations to the user, such as price, availability, distance from a point of interest, and so on. The map module 210 enables the user to interact with the rendered map, such as by zooming in on and/or zooming out of a geolocation, providing, as input, another geolocation, panning to another geolocation, clicking on and/or tapping on the geolocation and/or listed accommodations.

Figure 3A:
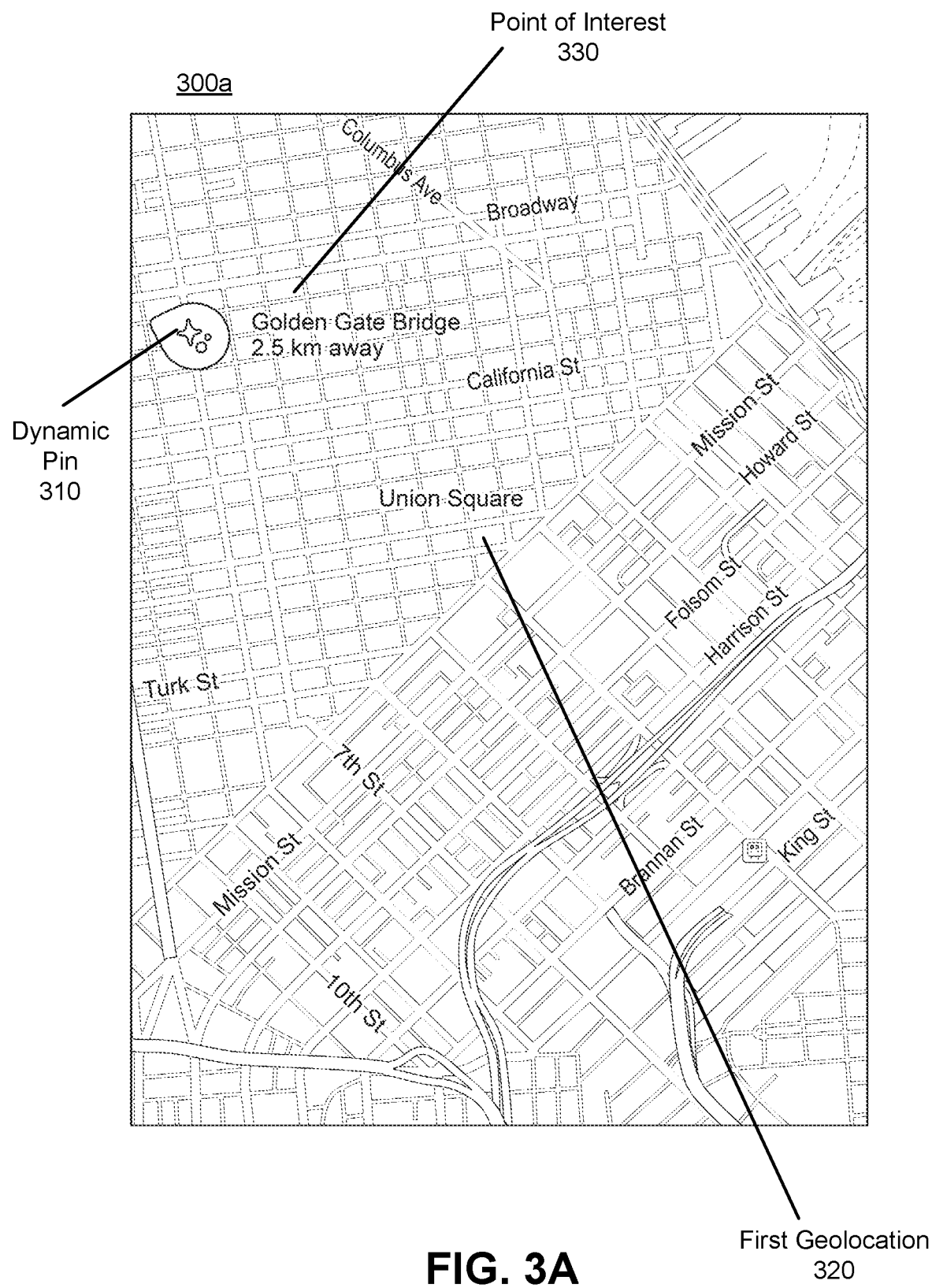
FIG. 3A illustrates one example embodiment of a map interface with a dynamic pin directing a user from a first geolocation to a point of interest.
Figure 3B:
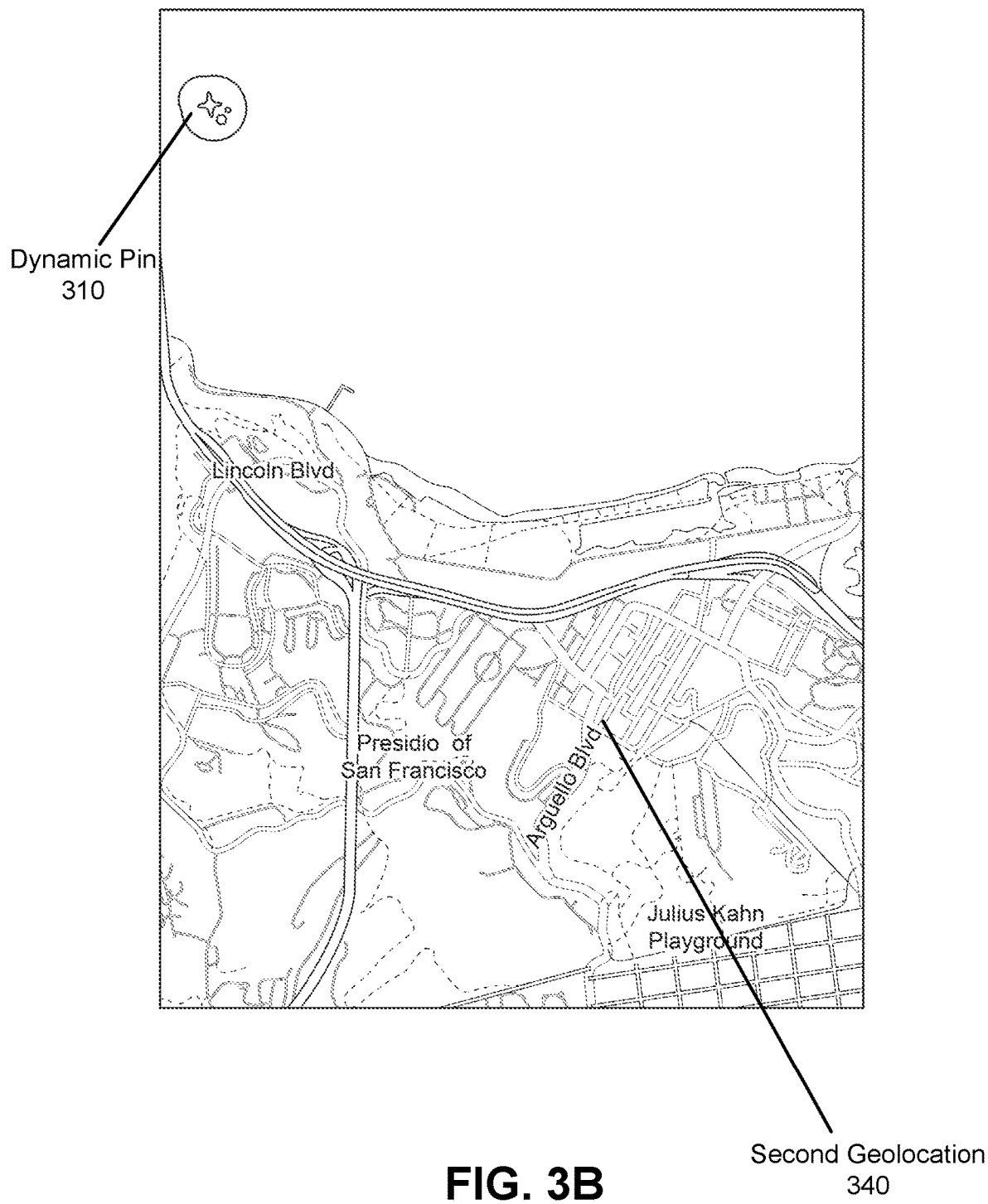
FIG. 3B illustrates one example embodiment of the map interface with the dynamic pin directing the user from a second geolocation to the point of interest of FIG. 3A.
Figure 3C:
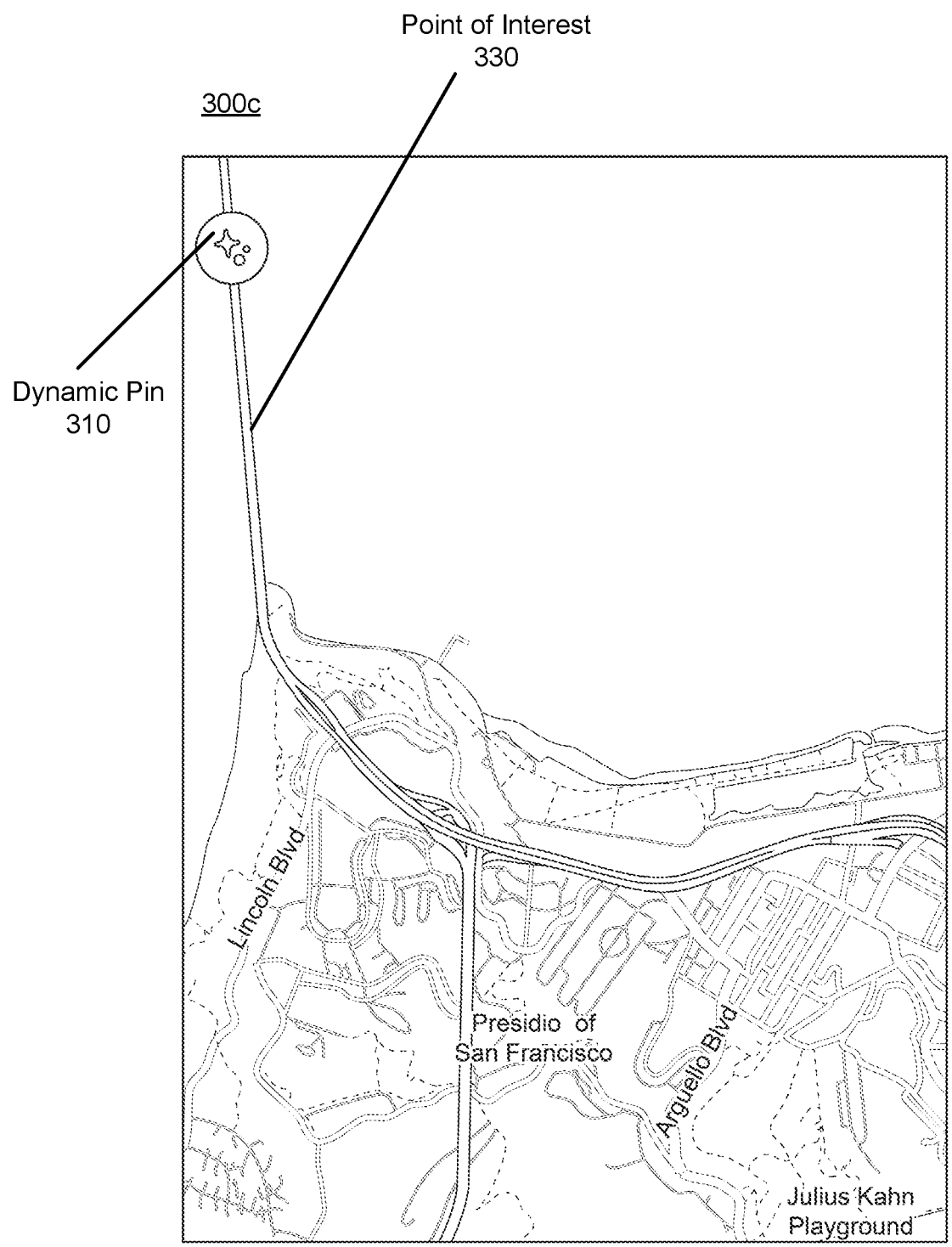
FIG. 3C illustrates one example embodiment of the map interface with the dynamic pin at the point of interest of FIG. 3A.

The dynamic pin module 220 directs the user of the booking accommodation application 130 to a point of interest via a dynamic pin. After the map module 210 renders a map interface showing an area corresponding to an input geolocation, the dynamic pin module 220 receives, as input from the user, the point of interest. The dynamic pin module presents a pin (e.g., a bubble) with a pointed edge that directs the user towards the point of interest. The pin, overlain on the map interface, dynamically changes shape in response to a new input geolocation. FIGS. 3A-C provide further detail on directing the user to a point of interest via the dynamic pin.

Figure 4A:
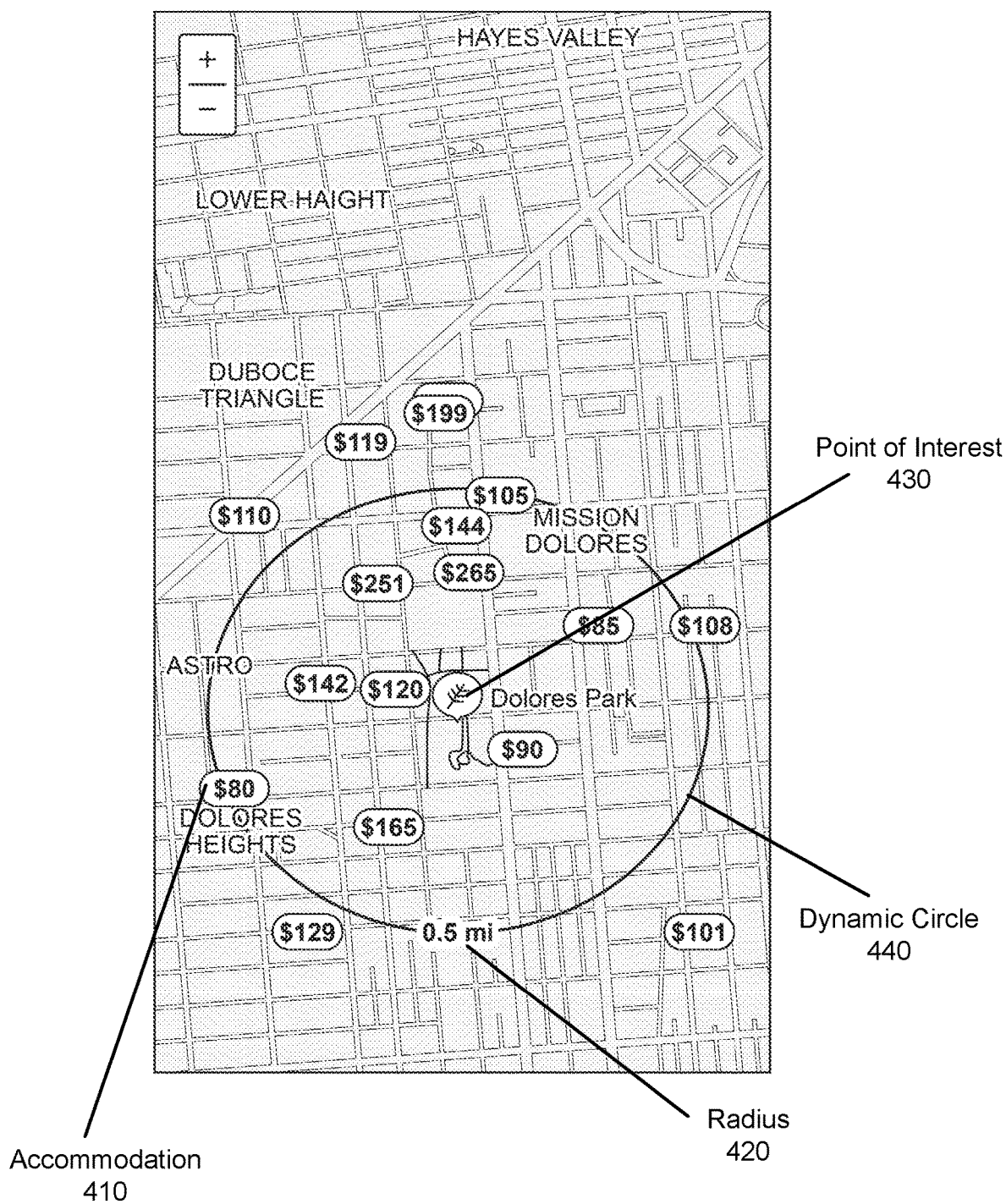
FIG. 4A illustrates one example embodiment of a map interface displaying accommodations relative to a radius about a point of interest.
Figure 4B:
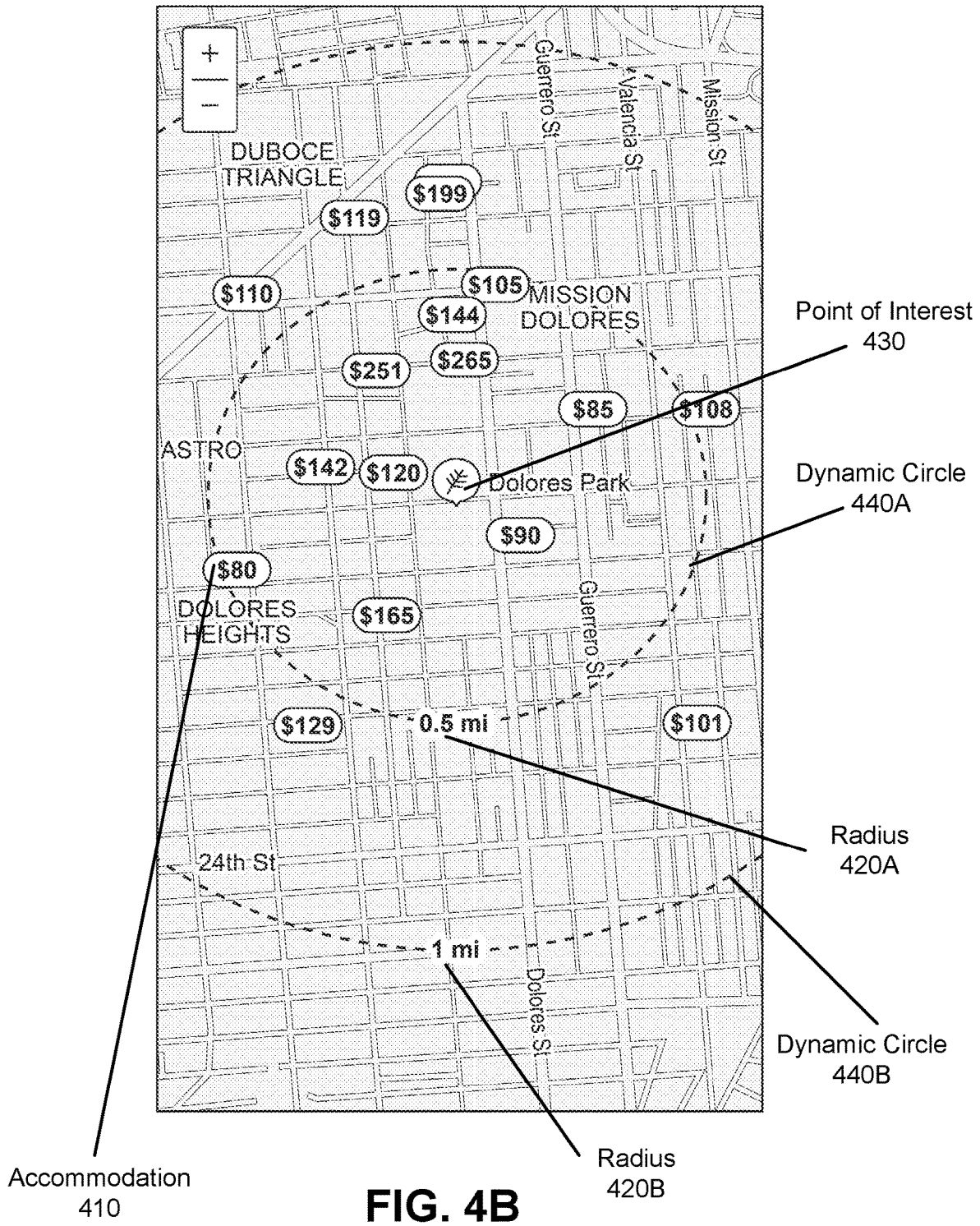
FIG. 4B illustrates one example embodiment of the map interface displaying accommodations relative to a plurality of radii about the point of interest of FIG. 4A.
Figure 4C:
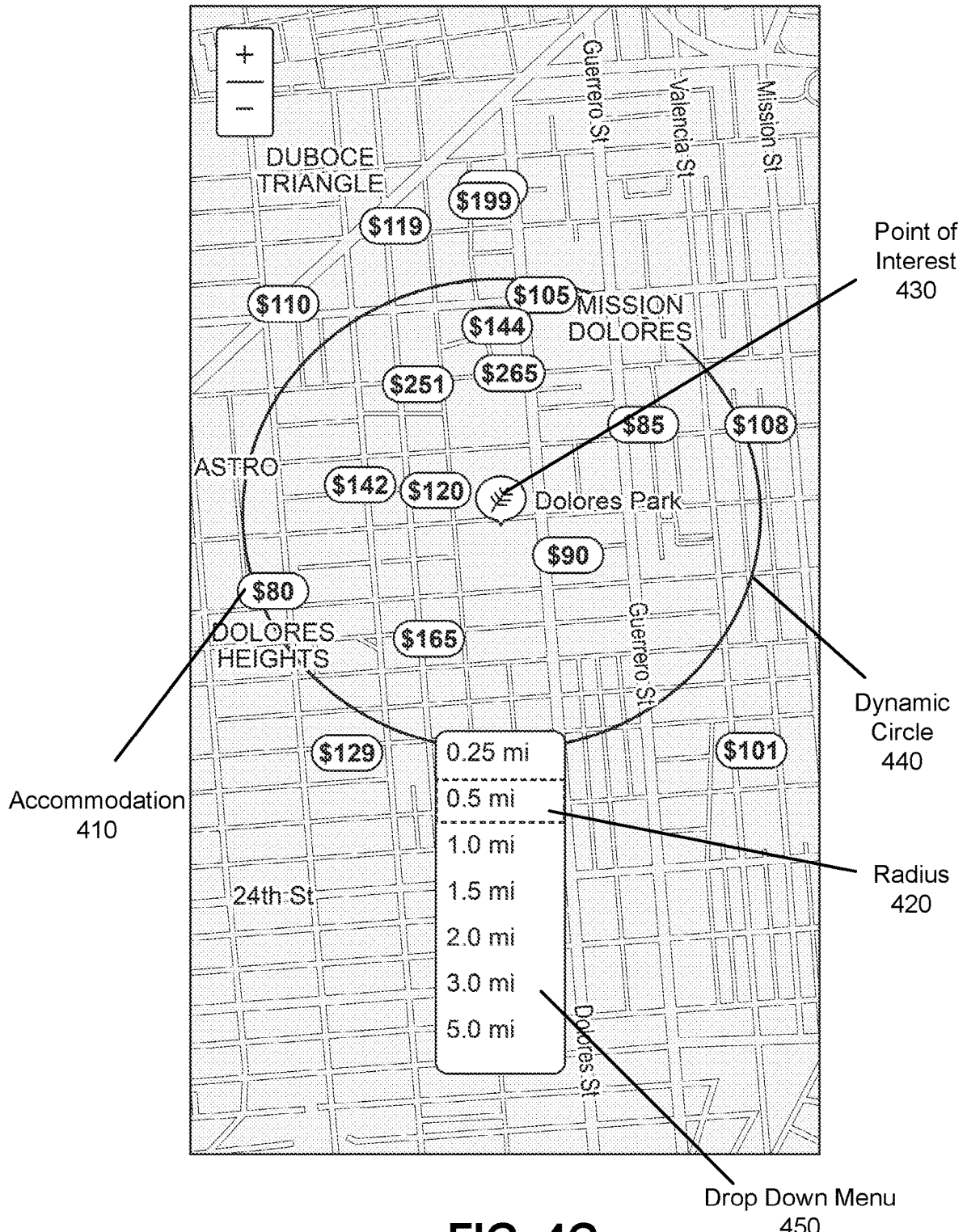
FIG. 4C illustrates one example embodiment of the map interface displaying a drop down menu for selecting the radius about the point of interest of FIG. 4A.

The dynamic circle module 230 displays accommodations relative to a radius about a point of interest. A user (e.g., a guest) of the booking accommodation application 130 inputs a threshold distance and a point of interest, indicating that the user is seeking accommodation within the threshold distance of the point of interest. Accordingly, the dynamic circle module 230 determines and displays accommodation options that are within a circle having a radius of the threshold distance, while also displaying the bounds of the circle. The dynamic circle module 230 dynamically adjusts the size of the circle having the radius of the threshold distance as the user zooms in to and/or out of the map interface. FIGS. 4A-C provide further detail on presenting accommodations within the dynamic circle. Also, it is noted that the geographic boundary of a circle is by way of example and for ease of discussion. Other embodiments may deploy other geometric patterns around a location of interest, for example, a square, triangle, pentagon, hexagon, an octagon, or the like.

Figure 5A:
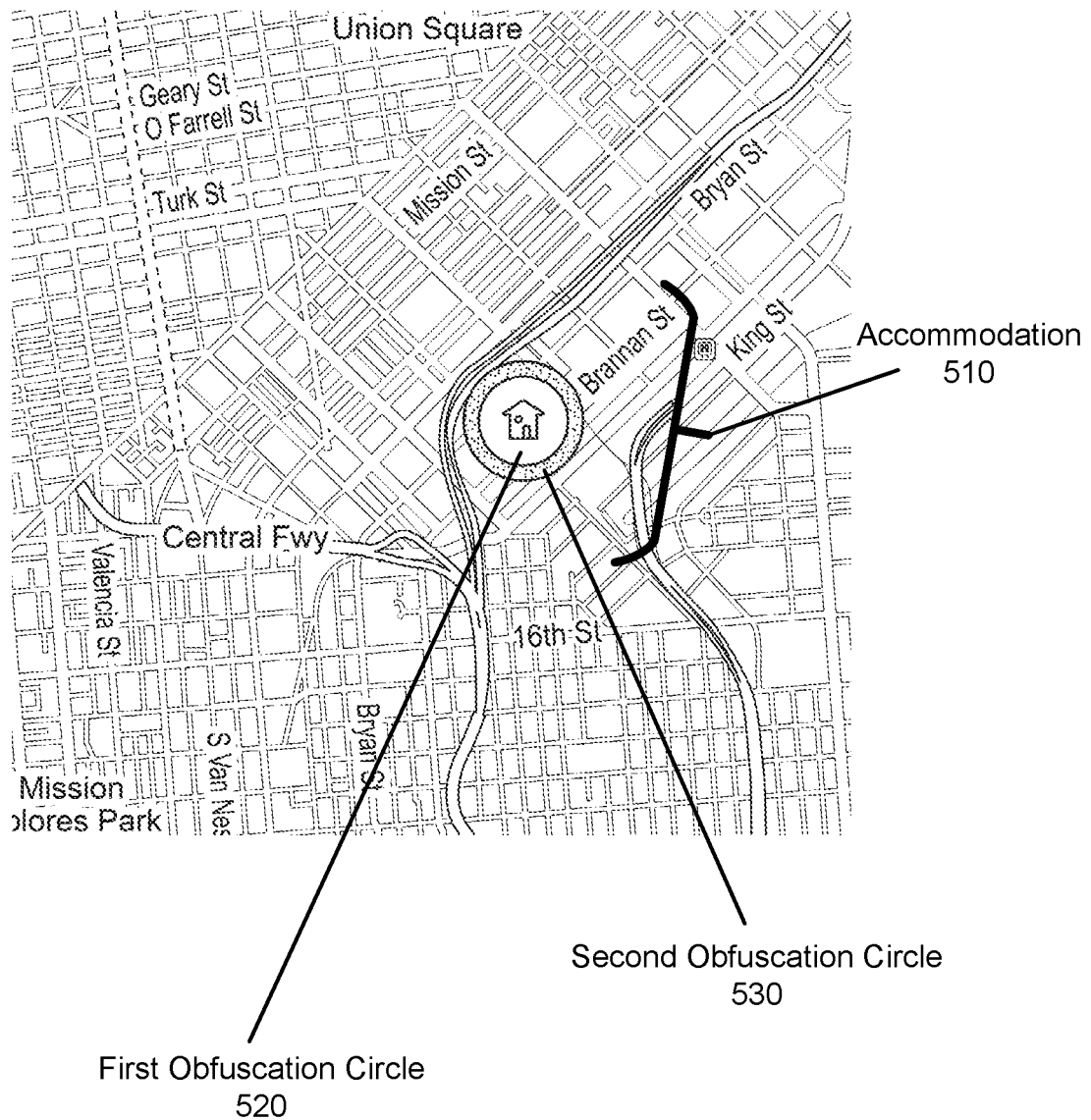
FIG. 5A illustrates one example embodiment of a map interface displaying an obfuscated location of an accommodation.
Figure 5B:
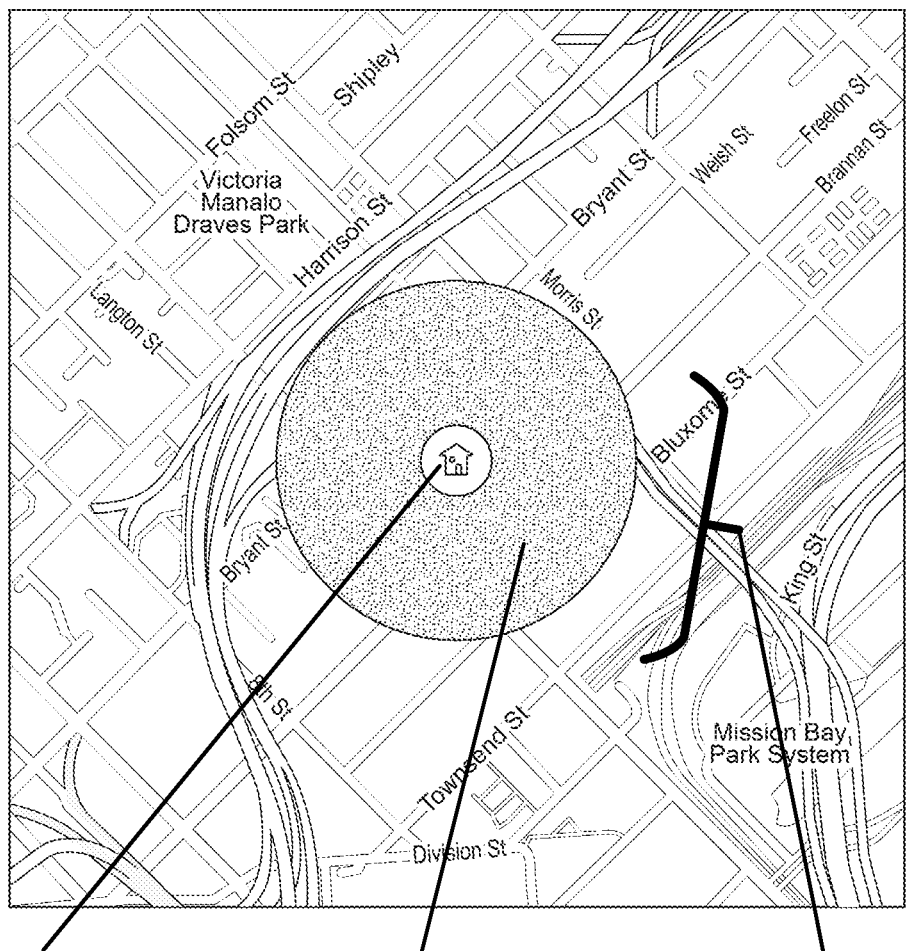

The obfuscation module 240 displays an obfuscated location of an accommodation. When providing accommodations to the booking accommodation application 130, hosts may prefer not to disclose a precise address of the accommodation. When a guest accesses the listed accommodation on the booking accommodation application 130, the obfuscation module 240 may obfuscate the exact location of the accommodation on the map interface rendered by the map module 210. The obfuscation module 240 presents, on the map interface, a visual representation of the accommodation. In some embodiments, the host can specify a size of the visual representation. As the guest zooms in to and/or out of the map interface, the obfuscation module 240 maintains the obfuscation of the accommodation's exact location while providing a general location on the rendered map. It is noted that the system may be configured so that a host may elect to enable or disable the obfuscation configuration. FIGS. 5A-B provide further detail on the visual representation that obfuscates accommodations.

The database 250 stores information about the booking accommodation application 130. The database 250 stores, for example, account information corresponding, respectively, to hosts and guests, as well as, listed accommodations, geographic maps from which the map interfaces are rendered, and so on.

Directing a User to a Point of Interest Via a Dynamic Pin

Figure 9:
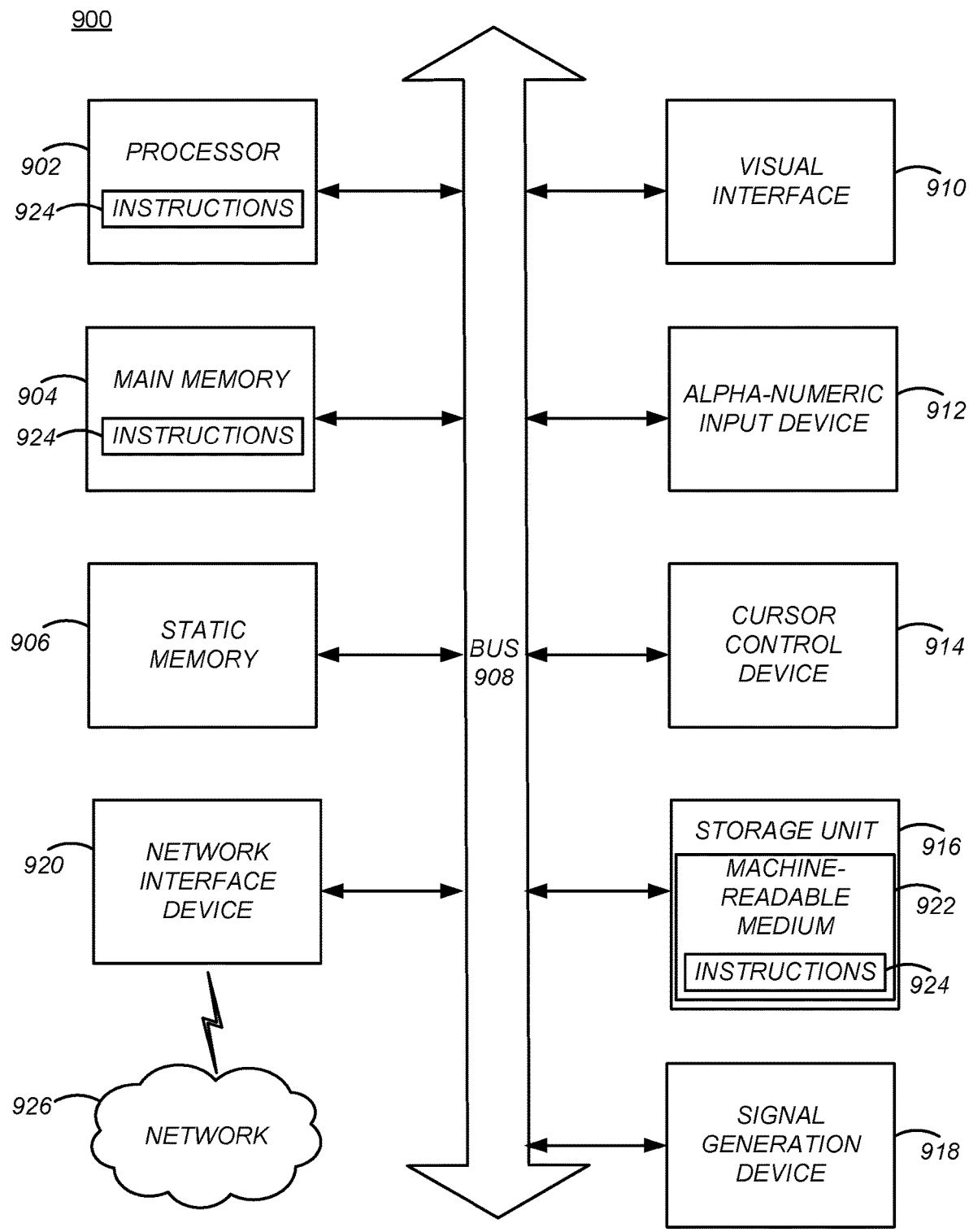
FIG. 9 illustrates a block diagram including components of an example machine able to read instructions from a machine-readable medium and execute them in a processor (or controller).

FIG. 3A illustrates one example embodiment of a map interface 300a that may be displayed on a screen associated with a computer system, e.g., a computer system having some or all of the component of the computer system described with FIG. 9. The map interface 300a in this example shows a dynamic pin 310 directing a user from a first geolocation 320 to a point of interest 330. The map module 210 of the booking accommodation application 130 renders the map interface displaying the first geolocation 320, and the dynamic pin module 220 renders and overlays the dynamic pin 310 and a name of the point of interest 330 on the map interface. A user (e.g., a guest) of the booking accommodation application 130 inputs the first geolocation 320 and the point of interest 330. The first geolocation 320 and/or the point of interest 330 may be manually input by the user. In some embodiments, the map module 210 determines the first geolocation 320 from a location of a client device of the user (e.g., a location determined via a GPS of the host client device 110 and/or the guest client device 120). In some embodiments, the dynamic pin module 220 determines the point of interest 330 from a search history of the user on the booking accommodation application 130.

The dynamic pin module 220 determines a route between the first geolocation 320 and the point of interest 330, and renders the dynamic pin 310 to point towards the point of interest 330. The dynamic pin 310 in this example is configured to have a tear drop shape bubble with a pointed portion directionally situated towards the point of interest. In the example of FIG. 3A, the point of interest 330 in the context of this rendered map is the Golden Gate bridge, located to the left of the first geolocation 320, which in the context of this rendered map is Union Square. Accordingly, the pointed portion of the dynamic pin 310 is directed towards a left side of the map interface. Similarly, if the point of interest 330 is located to the right of the first geolocation 320, the pointed portion of the dynamic pin 310 would be directed towards a right side of the map interface.

FIG. 3B illustrates one example embodiment of a first updated map interface 300b that may be displayed on a screen associated with a computer system, e.g., a computer system having some or all of the component of the computer system described with FIG. 9. The updated map interface 300b is rendered with the dynamic pin 310 directing the user from a second geolocation 340 to the point of interest 330 of FIG. 3A. The map module 210 receives another input indicating the second geolocation 340. The user may manually input the second geolocation 340 into the booking accommodation application 130. In some embodiments, the map module 210 determines the second geolocation 340 in response to the user panning to the second geolocation 340 on the map interface. In another embodiment, the map module 210 determines the second geolocation 340 in response to a change in the location of the user's client device.

The dynamic pin module 320 renders the dynamic pin 310 such that it dynamically changes shape in response to the second geolocation 340. If the second geolocation 340 is closer to the point of interest 330, the dynamic pin 310 is modified to have a rounded portion. In FIG. 3B, the second geolocation 340 is the Presidio, which is closer to the point of interest 330 of the Golden Gate Bridge, resulting in the dynamic pin 310 having a rounder shape compared to that in FIG. 3A.

FIG. 3C illustrates one example embodiment of a second updated map interface 310c that may be displayed on a screen associated with a computer system, e.g., a computer system having some or all of the component of the computer system described with FIG. 9. Here, the updated map interface 310c is rendered with the dynamic pin 310 at the point of interest 330 of FIG. 3A. As the map module 210 renders the map interface to include the point of interest 330, the dynamic pin module 320 modifies the shape of the dynamic pin 310 to now be completely round. Accordingly, the dynamic pin 310 has no pointed edges since in FIG. 3C, the map interface includes the point of interest 330, the Golden Gate Bridge. In some embodiments, when the map interface includes the point of interest 330, the dynamic pin module 320 removes the dynamic pin 310 from the display.

The dynamic pin 310 continues to dynamically change in response to determining new geolocations, which are either input by the user of the booking accommodation application 130 or automatically detected. In some embodiments, a user interaction (e.g., tapping and/or clicking) with the dynamic pin 310 causes the map module 210 to modify the map interface to directly show the point of interest 330. In some embodiments, in response to receiving, as input from the user, two points of interest, the dynamic pin module 220 generates two dynamic pins, each one substantially similar to the dynamic pin 310, to direct the user to each point of interest.

Displaying Mapped Points Relative to a User Input Radius

FIG. 4A illustrates one example embodiment of a map interface 400a that may be displayed on a screen associated with a computer system, e.g., a computer system having some or all of the component of the computer system described with FIG. 9. In this example, the map interface 400a displays accommodations 410 relative to a radius 420 about a point of interest 430. The map module 210 renders the map interface in response to the point of interest 430, input by the user and/or automatically determined from the user's prior use of the booking accommodation application 130. The dynamic circle module 230 receives, as input, a threshold distance from the point of interest, indicating that the user is seeking accommodations within the threshold distance from the point of interest. The user may provide the threshold distance. In some embodiments, the dynamic circle module 230 automatically determines the threshold distance based on a number of factors (e.g., popularity and/or accessibility of the area around the point of interest). The dynamic circle module 230 renders, on the map interface, a dynamic circle 440 having a radius of the threshold distance, i.e., the radius 420, the circle centered on the point of interest 430. The dynamic circle module 230 determines one or more accommodations 410 located within and/or near the dynamic circle 440 and displays them on the map interface. In some embodiments, the dynamic circle module 230 also displays information about the accommodations 410, such as cost. In other embodiments, the dynamic circle module 230 also displays travel time from each accommodation 410 to the point of interest 430, indicating a mode of transport for each travel time. For example, the accommodation 410 may be 20 minutes by walk to the point of interest 430, as opposed to 10 minutes by car. In FIG. 4A, accommodations 410 about the point of interest 430, Dolores Park, are displayed within and/or around the dynamic circle 440 having the radius 420 of 0.5 miles.

FIG. 4B illustrates one example embodiment of an updated map interface 400b that may be displayed on a screen associated with a computer system, e.g., a computer system having some or all of the components of the computer system described with FIG. 9. In this example, the map interface 400b displays accommodations 410 relative to a plurality of radii 420A, 420B about the point of interest 430 of FIG. 4A. In this example, responsive to receiving more than one threshold distance from the point of interest 430 (e.g., from multiple user inputs to the booking accommodation application 130), the dynamic circle module 230 generates dynamic circles 440A, 440B having radii of the threshold distances, i.e., the radii 420A, 420B. The dynamic circles 440A, 440B are centered on the point of interest 430. Accordingly, the dynamic circle module 230 determines and displays accommodations 410 relative to both dynamic circles 440A, 440B. The dynamic circle module 230 maintains the map interface with the accommodations 410 within and/or around the dynamic circles 440A, 440B even when the user zooms in and/or out of the map interface. FIG. 4B shows the two concentric dynamic circles 440A, 440B, centered around the point of interest 430, Dolores Park, with radii 420A, 420B, respectively, where the radius 420A is 0.5 miles, and 420B is 1 mile. Accommodations 410 within and/or around each of the dynamic circles 440A, 440B are displayed.

FIG. 4C illustrates one example embodiment of another updated map interface 400c that may be displayed on a screen associated with a computer system, e.g., a computer system having some or all of the component of the computer system described with FIG. 9. In this example, the map interface 410c displays a drop down menu 450 that may be overlaid over the rendered map for selecting the radius 420 about the point of interest 430 of FIG. 4A. The dynamic circle module 420 enables a user to provide input as to a preferred threshold distance from the point of interest 430. The dynamic circle module 230 provides, via the drop down menu 450, a predetermined number of threshold distances from which the user can select the radius 420 to assign the threshold distance. In some embodiments, in response to detecting a user interaction (e.g., tapping and/or clicking on) with the dynamic circle 440, the dynamic circle module 230 presents the user with the drop down menu 450.

In some embodiments, the dynamic circle module 230 receives input of a threshold travel time and/or a mode of transport from the point of interest 430. For example, the user may seek accommodations 410 that are less than 10 minutes by walk to the point of interest 430. The dynamic circle module 230 accordingly determines and displays accommodations that are within the threshold travel time by the specified mode of transport.

In some embodiments, the dynamic circle module 230 receives input indicating that the user is looking for other points of interest, rather than accommodations, within a threshold distance (e.g., the radius 420) from the point of interest 430. For example, the user may seek restaurants near the point of interest 430, Dolores Park. The dynamic circle module 230 accordingly presents the user with points of interest located within the dynamic circle 440 having the radius 420 about the point of interest 430.

In other embodiments, the dynamic circle module 230 receives input indicating that the user is looking for points of interest within a threshold distance from a selected accommodation 410. For example, the user may seek restaurants, landmarks, and tourist attractions within the radius 420 about the accommodation 410. Accordingly, the dynamic circle module 230 renders the dynamic circle 440 with the radius 420 centered on the accommodation 410, while displaying points of interest within and/or around the dynamic circle 440.

Obfuscating a Mapped Point

FIG. 5A illustrates one example embodiment of a map interface 510*a* that may be displayed on a screen associated with a computer system, e.g., a computer system having some or all of the components of the computer system described with FIG. 9. In this example, the map interface 500*a* displays an obfuscated location of an accommodation 510. When a user (e.g., a guest) accesses the booking accommodation application 130 to reserve the accommodation 510 listed by a host, the exact location of the accommodation 510 may be hidden by the host. The map module 210 renders the map interface 500*a* that includes the accommodation 510, while the obfuscation module 240 obfuscates the precise location of the accommodation 510.

The obfuscation module 240 visually represents the obfuscated location of the accommodation 510 with a first obfuscation circle 520 and a second obfuscation circle 530. The first obfuscation circle 520 obscures the exact location of the accommodation 510. The second obfuscation circle 530 indicates a general vicinity of the accommodation. The first and second obfuscation circles 520, 530 are opaque. In some embodiments, the first obfuscation circle 520 is opaque, while the second obfuscation circle 530 is translucent.

The obfuscation module 240 determines sizes of the first and second obfuscation circles 520, 530 based on a population density of the vicinity surrounding the accommodation 510. For example, in a city, as shown in FIG. 5A, relatively small obfuscation circles 520, 530 may obscure several buildings in the map interface, thus preventing the guest from determining the exact location of the host's accommodation 510. In a sparsely populated rural area, however, where accommodations are multiple miles away from one another, a visual representation of similar size may not sufficiently obscure the location of the accommodation. Thus, the obfuscation module 240 may present larger visual representations of accommodations in less densely populated areas, and smaller visual representations of accommodations in more densely populated areas. In some embodiments, the obfuscation module 240 determines sizes of the first and second obfuscation circles 520, 530 based on on input from the host of the accommodation 510. The host may, for example, specify radii for each of the first and second obfuscation circles 520, 530 via the host client device 110.

FIG. 5B illustrates one example embodiment of an updated map interface 510*b* that may be displayed on a screen associated with a computer system, e.g., a computer system having some or all of the components of the computer system described with FIG. 9. In this example, the map interface 500*b* displays the obfuscated accommodation 510 while zoomed in. As the user (e.g., a guest) zooms in to and/or out of the map interface (e.g., via the guest client device 120), the exact location of the accommodation 510 remains obfuscated. When the map interface is zoomed in, the obfuscation module 240 maintains the size of the first obfuscation circle 520, thereby obscuring the exact location of the accommodation 510. The obfuscation module 240 adjusts the size of the second obfuscation circle 530, however, indicating the vicinity of the accommodation 510. When the map interface is zoomed out, the obfuscation module 240 decreases the size of the first obfuscation circle 520 and may maintain the size of the second obfuscation circle 530 to indicate the vicinity of the accommodation 510.

Figure 6:
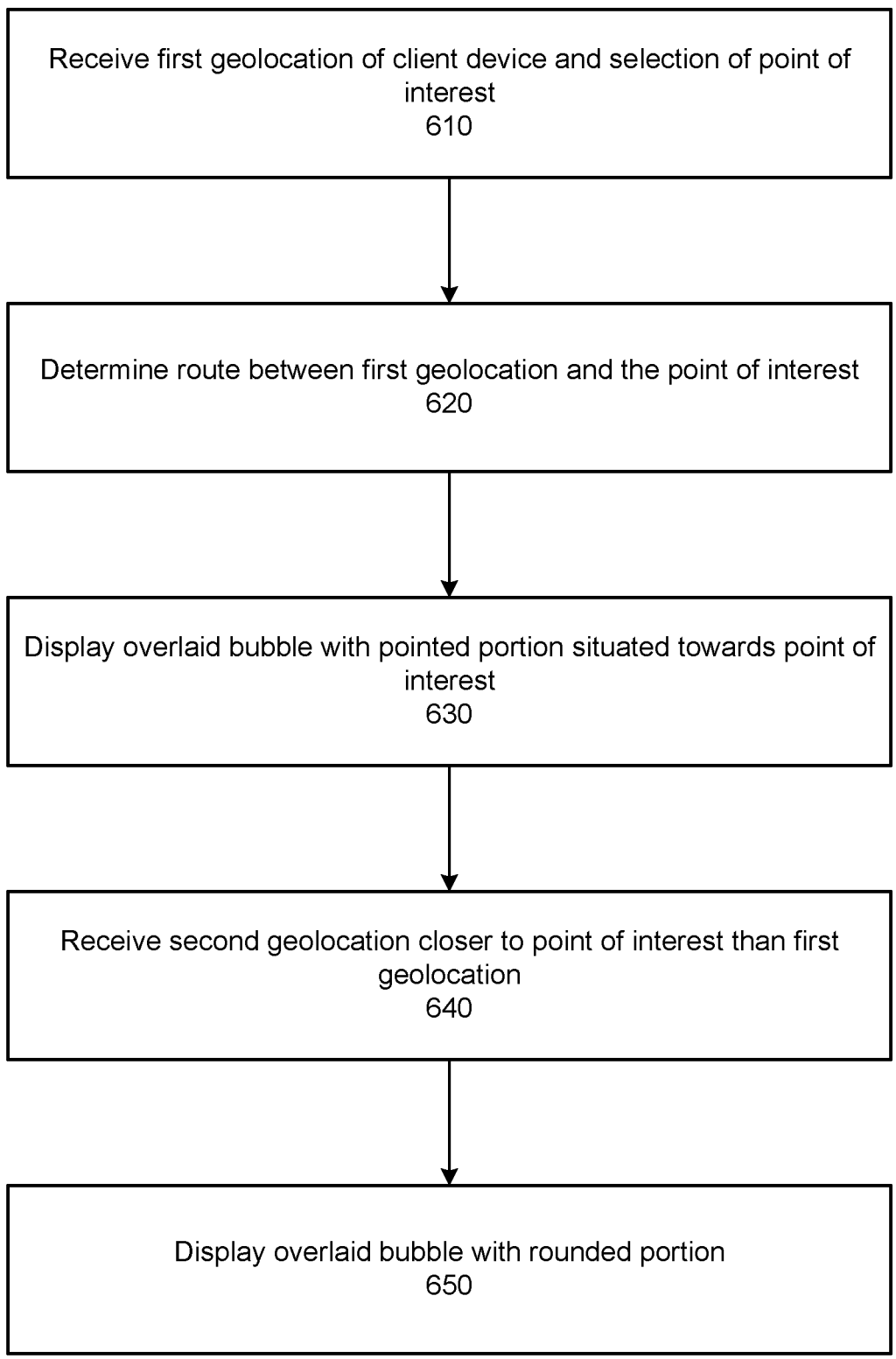
FIG. 6 illustrates one example embodiment of a process for directing a user to a mapped point of interest.

FIG. 6 illustrates one example embodiment of a process for directing a user to a mapped point of interest. The process may be performed by a dynamic pin module (e.g., the dynamic pin module 220) of a booking accommodation application (e.g., the booking accommodation application 130). The dynamic pin module receives 610 a first geolocation (e.g., the first geolocation 320) of a client device (e.g., the guest client device 120), and a selection of a point of interest (e.g., the point of interest 330). The dynamic pin module determines 620 a route between the first geolocation and the point of interest. The dynamic pin module displays 630 an overlaid bubble (e.g., the dynamic pin 310) with a pointed portion situated towards the point of interest. The dynamic pin module receives 640 a second geolocation (e.g., the second geolocation 340) closer to the point of interest than the first geolocation. The dynamic pin module subsequently displays 650 the overlaid bubble with a rounded portion, as compared to the pointed portion.

Figure 7:
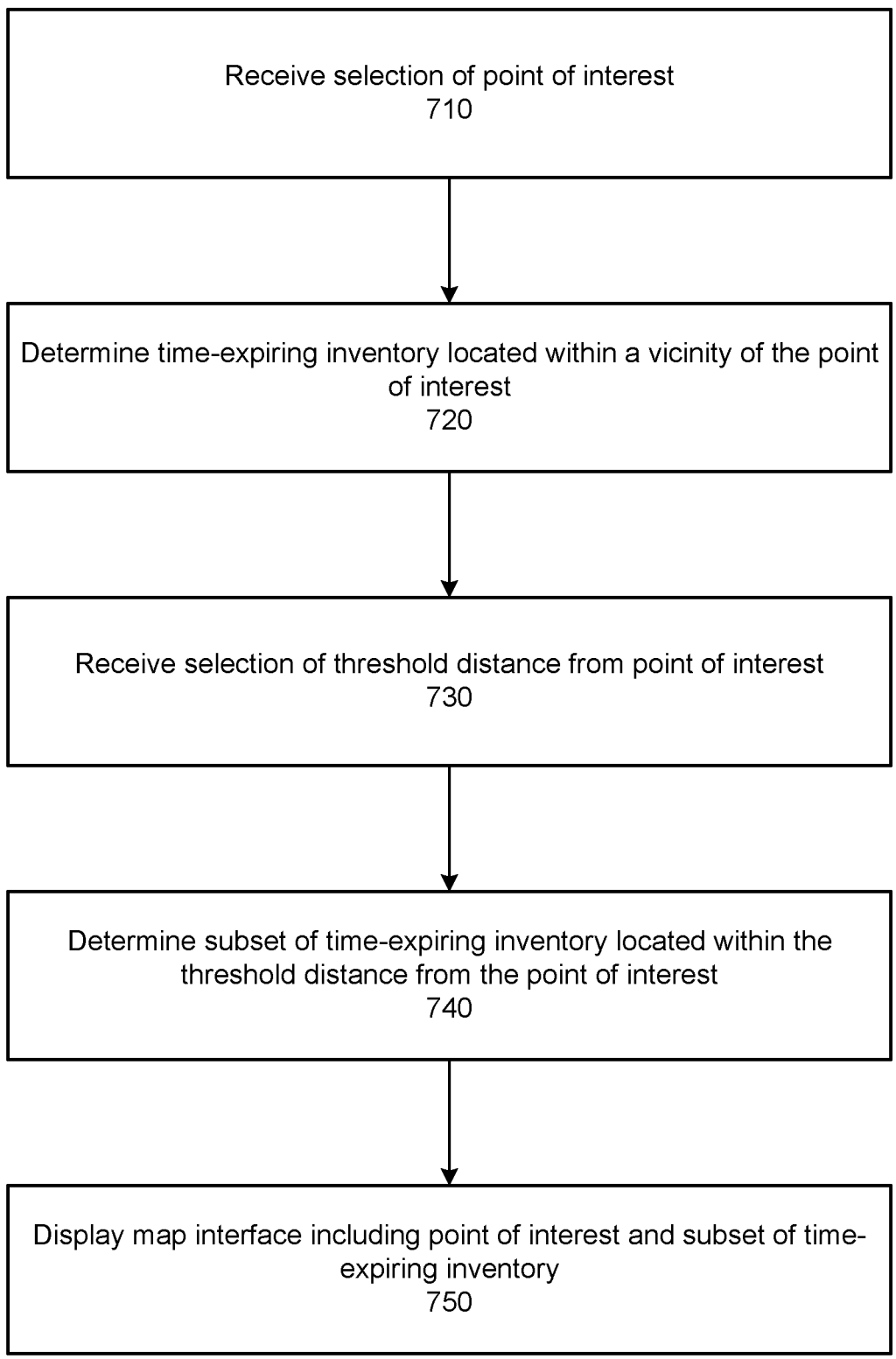
FIG. 7 illustrates one example embodiment of a process for displaying an accommodation relative to a radius about a point of interest.

FIG. 7 illustrates one example embodiment of a process for providing for display an accommodation relative to a radius about a point of interest. The process is performed by a dynamic circle module (e.g., the dynamic circle module 230) of a booking accommodation application (e.g., the booking accommodation application 130). The dynamic circle module receives 710 a selection of a point of interest (e.g., the point of interest 430). The dynamic circle module determines 720 a plurality of time-expiring inventory items (e.g., the accommodation 410) located within a vicinity of the point of interest. The dynamic circle module receives 730 a selection of a threshold distance (e.g., the radius 420) from the point of interest. The dynamic circle module determines 740 a subset of the time-expiring inventory items that are located within the threshold distance from the point of interest. In particular, the dynamic circle module determines a subset of the time-expiring inventory items that are within and/or near a circle (e.g., the dynamic circle 440) having a radius of the threshold distance. The dynamic circle module displays 750 a map interface including the point of interest and the subset of time-expiring inventory items within and/or near the threshold distance.

Figure 8:
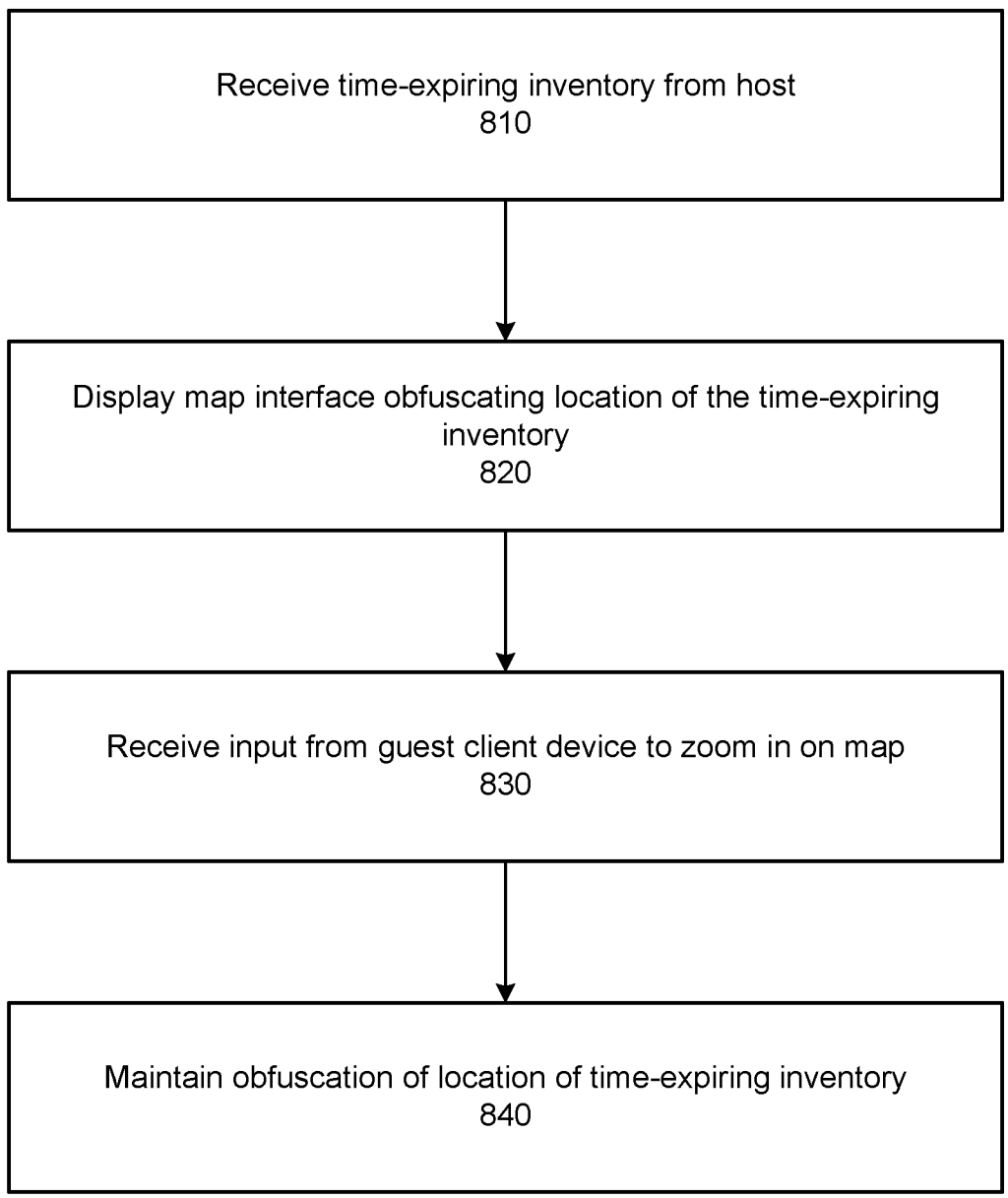
FIG. 8 illustrates one example embodiment of a process for dynamically obfuscating a mapped point.

FIG. 8 illustrates one example embodiment of a process for dynamically obfuscating a mapped point. The process is performed by an obfuscation module (e.g., the obfuscation module 240) of a booking accommodation application (e.g., the booking accommodation application 130). The obfuscation module receives 810 a time-expiring inventory item (e.g., the accommodation 510) from a host (e.g., via the host client device 110). The obfuscation module displays 820 a map interface obfuscating a location of the time-expiring inventory (e.g., via the first and second obfuscation circles 520, 530). The obfuscation module receives 830 input from a guest client device (e.g., the guest client device 120) to zoom in on the map interface. The obfuscation module maintains 840 the obfuscation of the location of the time-expiring inventory.

Computing Machine Architecture

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen. The computer system 900 may also include alphanumeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a map interface for use in a booking accommodation application through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for displaying a point of interest on a map user interface, the method comprising:
   receiving, at a booking accommodation application from a host client device, an item of time-expiring inventory having a precise location;
   storing a listing for the item of time-expiring inventory in a database;
   in response to receiving a request from a guest client device, retrieving the listing from the database and generating a map interface for display on the guest client device, the map interface including a visual representation of the item of time-expiring inventory with a first obfuscation shape obscuring the precise location of the item of time-expiring inventory and a second obfuscation shape indicating a vicinity of the item of time-expiring inventory, wherein a size of the visual representation is relative to a population density within a vicinity of the item of time-expiring inventory; and
   responsive to an input on the guest client device for zooming in on the map interface, maintaining a size of the first obfuscation shape obscuring the precise location of the item of time-expiring inventory and increasing a size of the second obfuscation shape indicating the vicinity of the item of time-expiring inventors to maintain obfuscating the precise location of the item of time-expiring inventory.

2. The computer-implemented method of claim 1, further comprising:
   responsive to an input on the guest client device for zooming out on the map interface, decreasing a size of visual representation to maintain obfuscating the precise location of the item of time-expiring inventory and provide for display a portion of a vicinity of the item of time-expiring inventory.

3. The computer-implemented method of claim 1, further comprising:
   receiving an input on the host client device, the input specifying the size of the visual representation; and
   modifying the size of the visual representation based on the input on the host client device.

4. The computer-implemented method of claim 1, wherein the first obfuscation shape comprises a first circle.

5. The computer-implemented method of claim 4, wherein the second obfuscation shape comprises a second circle.

6. A non-transitory computer readable storage medium comprising stored instructions, the instructions when executed by a processor cause the processor to perform operations comprising:
   receiving, at a booking accommodation application from a host client device, an item of time-expiring inventory having a precise location;
   storing a listing for the item of time-expiring inventory in a database;
   in response to receiving a request from a guest client device, retrieving the listing from the database and generating a map interface for display on the guest client device, the map interface including a visual representation of the item of time-expiring inventory with a first obfuscation shape obscuring the precise location of the item of time-expiring inventory and a second obfuscation shape indicating a vicinity of the item of time-expiring inventory, wherein a size of the visual representation is relative to a population density within a vicinity of the item of time-expiring inventory; and
   responsive to an input on the guest client device for zooming in on the map interface, maintaining a size of the first obfuscation shape obscuring the precise location of the item of time-expiring inventory and increasing a size of the second obfuscation shape indicating the vicinity of the item of time-expiring inventors to maintain obfuscating the precise location of the item of time-expiring inventory.

7. The non-transitory computer readable storage medium of claim 6, the operations further comprising:
   responsive to an input on the guest client device for zooming out on the map interface, provide for display a decrease in a size of the visual representation to maintain obfuscating the precise location of the item of time-expiring inventory and provide for display a portion of a vicinity of the item of time-expiring inventory.

8. The non-transitory computer readable storage medium of claim 6, the operations further comprising:
   receiving an input on the host client device, the input specifying the size of the visual representation; and
   modifying the size of the visual representation based on the input on the host client device.

9. The non-transitory computer readable storage medium of claim 6, wherein the first obfuscation shape comprises a first circle.

10. The non-transitory computer readable storage medium of claim 9, wherein the second obfuscation shape comprises a second circle.

11. A computer system comprising:
    one or more computer processors; and
    a non-transitory computer readable storage medium comprising computer executable instructions that when executed by the one or more computer processors causes the one or more computer processors to perform operations comprising: receiving, at a booking accommodation application from a host client device, an item of time-expiring inventory having a precise location;
    store storing a listing for the item of time-expiring inventory in a database;
    in response to receiving a request from a guest client device, retrieving the listing from the database and generating a map interface for display on the guest client device, the map interface including a visual representation of the item of time-expiring inventory with a first obfuscation shape obscuring the precise location of the item of time-expiring inventory and a second obfuscation shape indicating a vicinity of the item of time-expiring inventory, wherein a size of the visual representation is relative to a population density within a vicinity of the item of time-expiring inventory; and responsive to an input on the guest client device for zooming in on the map interface, maintaining a size of the first obfuscation shape obscuring the precise location of the item of time-expiring inventory and increasing a size of the second obfuscation shape indicating the vicinity of the item of time-expiring inventors to maintain obfuscating the precise location of the item of time-expiring inventory.

12. The computer system of claim 11, wherein the operations further comprise:

responsive to an input on the guest client device for zooming out on the map interface:

providing for display a decrease in the size of the visual representation to maintain obfuscating the precise location of the item of time-expiring inventory; and providing for display a portion of a vicinity of the item of time-expiring inventory.

13. The computer system of claim 11, wherein the operations further comprise:

receiving an input on the host client device, the input specifying the size of the visual representation obfuscating the precise location of the item of time-expiring inventory; and modifying the size of the visual representation based on the input on the host client device.

14. The computer system of claim 11, wherein the first obfuscation shape comprises a first circle.

15. The computer system of claim 14, wherein the second obfuscation shape comprises a second circle.

16. The computer-implemented method of claim 1, wherein the size of the visual representation is larger in a less densely populated area.

17. The computer-implemented method of claim 1, wherein the size of the visual representation is smaller in a more densely populate area.

18. The non-transitory computer readable storage medium of claim 6, wherein the size of the visual representation is larger in a less densely populated area.

19. The non-transitory computer readable storage medium of claim 6, wherein the size of the visual representation is smaller in a more densely populate area.

20. The computer system of claim 11, wherein the size of the visual representation is larger in a less densely populated area and the size of the visual representation is smaller in a more densely populate area.

* * * * *